350-3.6
XR 3,600,096

United States

[11] 3,600,096

[72] Inventors Lee O. Heflinger
Torrance;
Robert E. Brooks, Redondo Beach, both of, Calif.
[21] Appl. No. 846,358
[22] Filed July 31, 1969
[45] Patented Aug. 17, 1971
[73] Assignee TRW Inc.
Redondo Beach, Calif.

[54] HOLOGRAPHIC INTERFEROGRAMS WITH INCREASED LIGHT INTENSITY
5 Claims, 4 Drawing Figs.

[52] U.S. Cl. ........................................ 356/106, 350/3.5
[51] Int. Cl. ........................................ G01b 9/02, G02b
[50] Field of Search ........................................ 356/106; 350/3.5

[56] References Cited
OTHER REFERENCES
" Holographic Interferometry," Journal of Applied Physics, Heflinger et al., Vol. 37, No. 2, Feb. 1966.

Primary Examiner—Ronald L. Wibert
Assistant Examiner—Conrad Clark
Attorneys—Daniel T. Anderson, Edwin A. Oser and Jerry A. Dinardo ABSTRACT: A holographic interferogram which permits viewing of an object at very high orders of diffraction for increasing the phase sensitivity as well as the light intensity. A double-exposure holographic technique is used whereby a first hologram is made on a first recording material of the setup without an object and a second hologram is made on a second recording material with the object to be recorded. The recording materials are heavily exposed so that the fringe lines corresponding to minimum light intensity are narrow compared to the fringe spacing. They are reproduced on a third recording material by successively exposing the first recording material and displacing it by a predetermined fraction of the fringe spacing $1/n$ where $n$ is the number of exposures. The second recording material is similarly reproduced on the same third recording material. The thus obtained new hologram may be reconstructed by viewing it in the light diffracted into a very high order. In this manner not only is the phase sensitivity multiplied by the order by which the object is viewed, but also the light intensity is much increased.

PATENTED AUG 17 1971
3,600,096
SHEET 1 OF 2
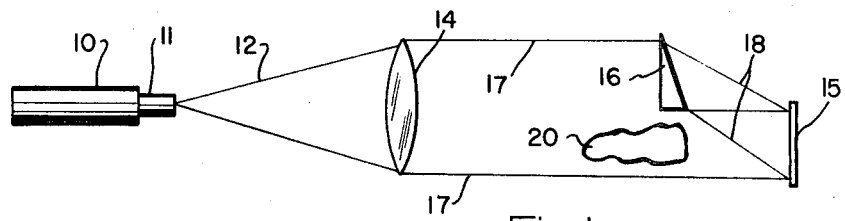
Fig.1
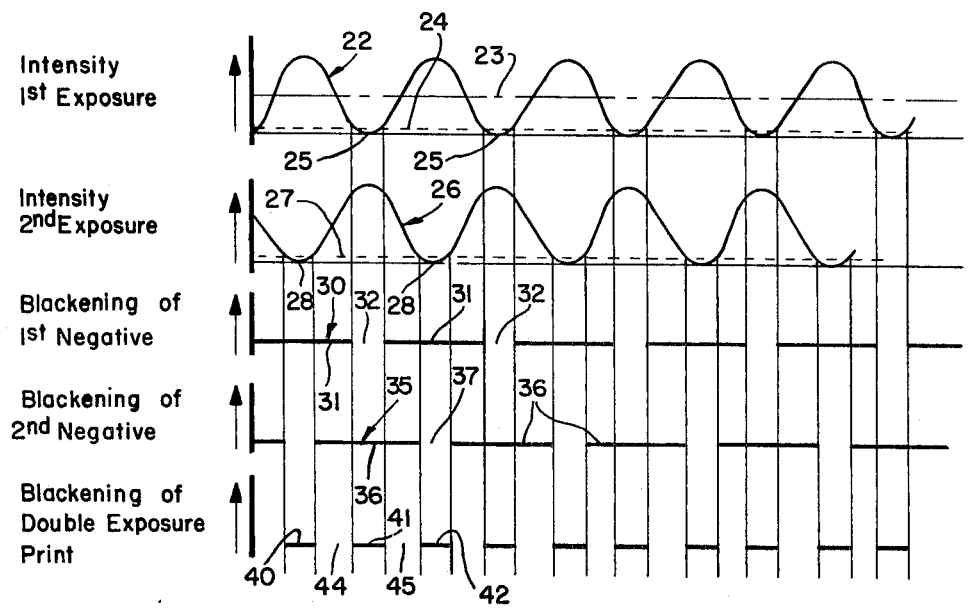
Fig.2 → DISTANCE
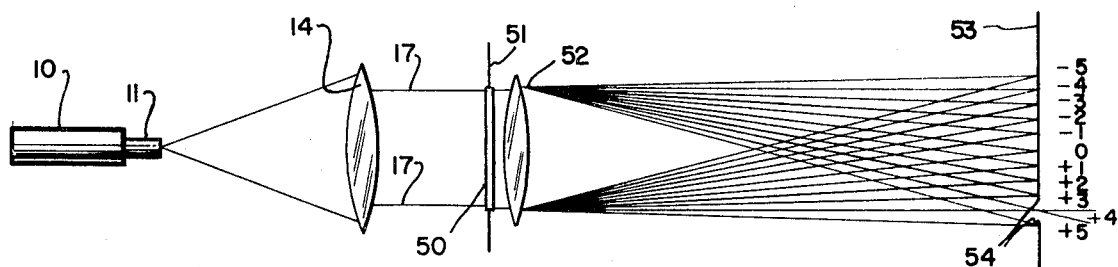
Fig.3
Robert E. Brooks
Lee O. Heflinger
INVENTORS
BY *(signature)*
ATTORNEY

HOLOGRAPHIC INTERFEROGRAMS WITH INCREASED LIGHT INTENSITY

The invention described herein was made in the performance of work under a NASA contract and is subject to the provisions of Section 305 of the National Aeronautics and Space Act of 1958, Public Law 85–568 (72 Stat. 435; 42 U.S.C. 2457).

CROSS-REFERENCE TO RELATED APPLICATION

The present application may be considered to be an improvement over that of the copending application to Lee O. Heflinger, entitled "Holograms Having Increased Phase Sensitivity," Ser. No. 846,463 (D–4335), filed currently herewith and assigned to the assignee of the present application.

BACKGROUND OF THE INVENTION

This invention relates generally to holography, and particularly relates to a process of producing a holographic interferogram having increased phase sensitivity and an increased light intensity when viewed in high diffracted orders.

It is well known in classical interferometry that a diffraction grating is capable of diffracting the light into higher orders. The resolution of a spectrum, for example, is a direct function of the order number used. Accordingly it would be highly desirable to make use of holographic interferometry where high orders of diffraction are used for increasing the phase sensitivity. The phase sensitivity can be increased by a factor equal to the order number used. However, although it is quite apparent that light diffracted into the $n$th order from an interferogram has $n$th times the phase variation or $n$ times the phase perturbation produced by an object, it is not quite so simple to diffrate the light into an $n$ order higher than the first order, in such a manner that phase perturbations between the two exposures are multiplied.

Thus one might want to use a stored beam interferometer. In this case the $n$th order reconstruction might be obtained by interfering the $n$th order output beam with a plane wave which is superimposed on the $n$th order beam. This however requires a reference beam having a wave front which is flat to a fraction of a light wave. This in turn requires substantially perfect optical elements and substantially perfect alignment within a fraction of a wavelength.

In order to do away with the requirement of optical elements and alignment of the elements to be perfect within a fraction of a wavelength, double-exposure holography may be considered. In this conventional process two exposures are made on the same recording plate to obtain a single hologram. One exposure is made with the subject and the other without. After the recording plate has been thus twice exposed, it is developed and reconstructed. However it is found that the interference pattern observed in second or higher orders of diffraction is the same as that observed in the first order. In other words, this does not yield the desired multiplication of the phase sensitivity of the higher diffraction order.

Still another approach to the utilization of higher orders of diffraction is to make two exposures, one each on a separate recording plate to obtain the results of double-exposure holographic interferometry. These two separate plates may then be reconstructed by placing the plates in contact with each other in the reconstruction beam.

A process in accordance with the copending application above referred to produces a holographic interferogram which has increased phase sensitivity. In other words, the phase perturbations produced by the object to be recorded can be increased to a considerable extent. This process comprises the steps of initially generating a reference and a scene beam, preferably from a laser source or from the same monochromatic light source. The scene and reference beams are caused to impinge on a first photosensitive recording material to generate a first hologram.

This recording material is exposed heavily. This means that fringe lines are generated with narrow clear spaces, each corresponding to a minimum of light intensity, these clear spaces (fringe lines) are narrow compared to the fringe spacing.

Thereafter the same process is repeated with an object to be recorded interposed into the scene beam. Thus a second hologram is made which is again heavily exposed. Then light and dark portions of the first two holograms are reversed and combined. The combined holograms may be recorded on a third photosensitive material to obtain a double-exposed hologram. This hologram is reconstructed by means of monochromatic light. The object is now viewed with the light diffracted into a predetermined order larger than the first order. Accordingly the phase sensitivity is multiplied by the order in which the object is viewed.

Unless the fringe lines of the first two holograms are quite narrow compared to the spacing of the interference fringes, they may overlap. If the fringe lines overlap, the hologram becomes very amplitude sensitive particularly if one hologram is exposed longer than the other. In other words, unless the exposures of the two holograms are precisely equal, it is practically impossible to evaluate the resulting hologram unless the fringe lines are very narrow or fine. Thus, if the fringe lines are fine, the exposure time of the two holograms is not critical any more.

However, it has been found that with the process of the present application, it is possible to view the object in the light of very high diffracted orders. This is possible in spite of the fact that the light intensity rapidly falls off.

It is accordingly an object of the present invention to provide a method of utilizing holographic interferometry which permits to view the object in very high orders of diffraction.

A further object of the present invention is to provide a method of utilizing holographic interferometry with much increased light intensity in the higher diffracted orders, coupled with an increased phase sensitivity.

SUMMARY OF THE INVENTION

A process in accordance with the present invention produces a holographic interferogram having not only increased phase sensitivity, but also increased light intensity in higher diffracted orders. This process comprises the steps of generating a reference beam and a scene beam from the same substantially monochromatic light source, such for example, as a laser source. The scene and reference beams are caused to impinge on a first photosensitive recording material to generate a first hologram. The first recording material is exposed heavily. Accordingly, fringe lines corresponding substantially to the absence of light are created on the first recording material. These fringe lines are narrow compared to the fringe spacing.

Thereafter the same process is repeated with an object to be recorded interposed into the scene beam. Accordingly, a second photosensitive recording material is heavily exposed to create a second hologram.

What has been described so far is identical with the process of the above-referred to copending application. However, in accordance with the present invention, a replica of the first recording material is now prepared on a third photosensitive material by successively exposing the first recording material and displacing it. Thus, after each exposure of the first recording material it is displaced by a fraction, $1/n$ of the fringe spacing, where $n$ is the number of exposures.

The same process is then repeated with the second recording material. Accordingly the second recording material is also displaced after each exposure by the same fraction $1/n$ of the fringe spacing and it is recorded on the same third recording material. In this manner, a double-exposed hologram is obtained, having additional interpolated fringe lines.

This double-exposed hologram is then reconstructed by substantially monochromatic light. The object is viewed with light diffracted into a predetermined, very large order. This makes it possible to increase both the phase sensitivity and the light intensity. Actually, if the original fringes have been exposed $n$ times, the double-exposure hologram will diffract $n^2$ times as much light at an angle corresponding to the $n$th order of the original.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a schematic representation of a conventional holographic system for taking holograms in accordance with the process of the present invention;

FIG. 2 is a series of diagrams to explain the narrow fringes created on two separate holograms and their appearance in a reversed reproduction for practicing the process of the present invention;

FIG. 3 is a schematic representation of apparatus for reviewing a holographic interferogram made by the process of the present invention.

DESCRIPTION OF THE PREFERRED EMBODIMENT

Figure 4:
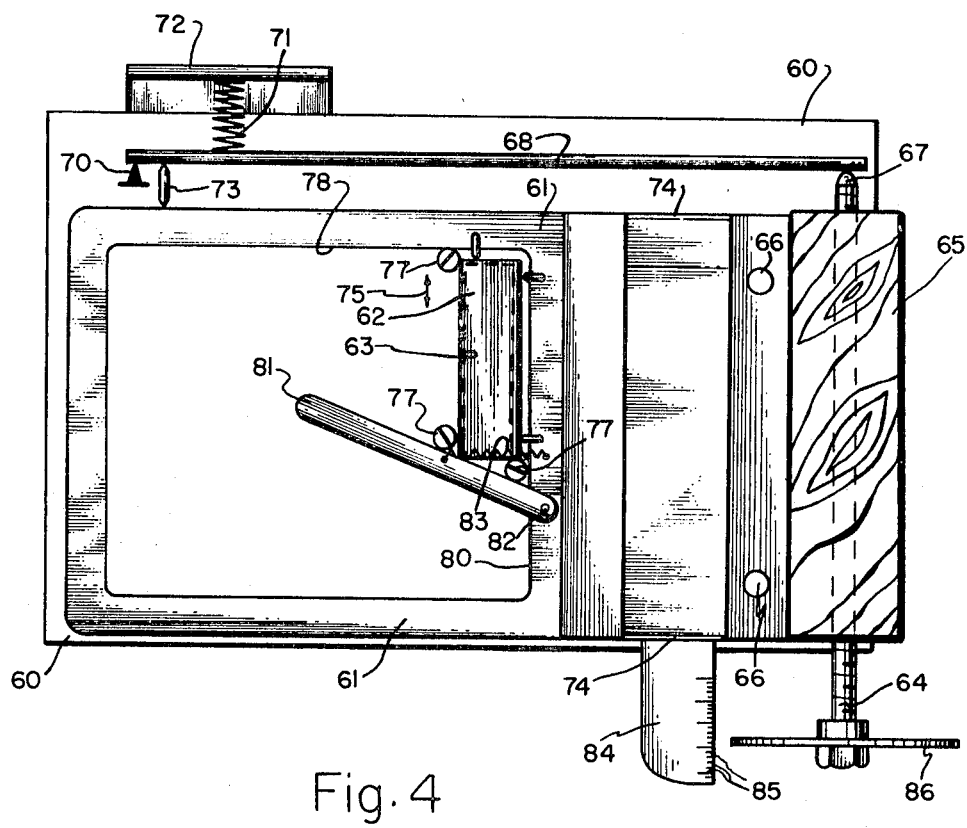
FIG. 4 is a top plan view of apparatus for precisely displacing one of the holograms previously obtained for exposing and printing it on a final double-exposed hologram in accordance with the present invention.

Referring now to the drawings and particularly to FIG. 1 there is illustrated a conventional holographic arrangement for practicing the method of the present invention. There is provided a source 10 of substantially monochromatic light. Preferably this is a laser as shown, but may consist of another light source, such as a mercury discharge lamp utilizing a single mercury isotope for generating substantially monochromatic light. There is also provided a lens system 11 for diverging the laser beam as shown at 12. This may, for example, consist of any conventional diverging lens or it may be a microscope objective. The diverge beam 12 is then collimated by another lens 14 and is directed toward a recording material 15 for recording the light impinging thereon. Such a photosensitive recording material 15 may consist, for example, of a photographic film or plate, of a photochromic material or any other suitable photosensitive material. The collimating lens 14 may be a double-convex lens as shown.

In order to provide a reference beam there may be provided a prism or wedge 16 extending over substantially one-half the area of the collimated light beam 17. The purpose of the prism 16 is to deflect the light beam to create a reference beam 18, which substantially covers the entire surface of the recording material 15. An object 20 to be recorded may be disposed in the lower portion of the collimated light beam or scene beam 17 so that a hologram of the object 20 may be taken. The arrangement of FIG. 1 guarantees that the scene beam and the reference beam are of substantially equal intensity at the recording material 15.

The holographic arrangement of FIG. 1 is conventional. One of its purposes is to generate a reference beam 18, making a very small angle with a subject beam 17. Thus, in general, the angle between the two beams should be smaller than 10°. Preferably, however, the angle between the subject and reference beams is between 1° and 2° and may be even smaller than 1°. The reason for this arrangement is that a small angle between reference and subject beams creates relatively large interference fringes on the hologram. This is desirable for the purpose of the present invention, as will be more fully explained hereinafter. Instead of utilizing a prism 16 for generating the reference beam 18, it is also feasible to use other conventional interferometric arrangements. Among those may be mentioned the Michelson interferometer or the Mach-Zehnder interferometer.

The manner in which a holographic interferogram is generated in accordance with the present invention will now be explained. Initially a first hologram or a first recording material is produced without a subject 20. This hologram should be heavily exposed so that the interference fringe lines are narrow compared to the interference fringe spacing. The fringe lines are the lines obtained where there is cancellation of the light beams or a minimum of light intensity. In other words, there is substantially an absence of light. This will be more fully explained hereinafter.

After the first hologram has been obtained in this manner the object 20 is introduced into the scene beam 17 and a second hologram is made on a second recording material. This hologram is also heavily exposed.

Subsequently the clear and opaque portions of the two holograms are reversed and combined to provide a new hologram. This may, for example, be effected by making contact prints on a third recording material.

The significance of relatively thin fringe lines, that is, fringe lines which are a small fraction of the fringe spacing will now be explained by reference to FIG. 2. Thus the wave 22 of FIG. 2 indicates generally the intensity of a light beam recorded on the first recording material. Thus, if a recording material such as photographic plate is exposed in a normal manner, all the waves above a dotted line 23 corresponding to the exposure threshold will appear dark or black, and those below the dotted line will appear light or clear. It will readily be seen that in that case, the fringe lines are about as wide as the spacing between adjacent fringes. Therefore, in accordance with the present invention the plate is heavily exposed and the exposure threshold is shown by the dotted line 24, which should be very close to the zero line. It will now be seen that only a narrow portion of the lower peaks of the wave 22, that is, the portions 25, appear clear. Therefore by exposing the plate very heavily, the width of these wave portions 25 resulting in the fringe lines can be made very narrow.

The wave 26 similarly indicates another light wave recorded by the second recording material while the object 20 is present. The wave 22 and 26 have the same frequency or wavelength, but have different phases; the phase difference arising from the presence of the object. Accordingly, as shown in FIG. 2, the two waves 22 and 26 are not in phase. Again, the second recording material is heavily exposed, as indicated by the dotted line 27 showing the exposure threshold. As a result, only the lower peaks 28 result in clear fringe lines.

A picture of a portion of the first negative or the first recording material is schematically shown at 30. It will be noted that there are alternate black portions 31 and light portions 32, the latter corresponding to the lower wave portions 25 of the wave 22. Similarly, for the second recording material made with the object 20 in place, there is obtained a negative 35 having alternate black portions 36 and light portions 37. The light portions correspond to the lower wave peaks 28.

When these two negatives are reversed and combined, say by a contact print or in any other way, the portions 32 and 37 which were previously clear now become dark as indicated at 40, 41, 42, etc. On the other hand, the portions 44, 45, etc. are light or clear. These correspond to the previously dark portion, such as 31 or 36, which do not register with one of the clear portions, such as 32 or 37.

It will now be apparent why it is important to have narrow fringe lines. In the first place, this will create a minimum of undesirable interaction between two sets of fringe lines from the two holograms. Furthermore it is well known that narrow lines diffract light more uniformly into higher orders than broad lines. Thus the narrower the lines are the less there is a chance of overlap of the fringe lines of the different holograms. It should also be noted that since the two original waves 22 and 26 are not in phase, the fringe lines, such as 32 and 37 change relative distances in accordance with the difference of the phases. It will also be obvious that what is needed is not only a narrow fringe line but one with a clean edge.

This depends in part on the gamma of the film. This has to do with the contrast of the film and should ideally be infinity. Of course, as a practical matter, there is no emulsion with an infinite gamma. However, it is recommended to use an emulsion such as Kodak 649 F emulsion or Kodak Kodalith Pan emulsion. These are emulsions with high contrast and great resolution.

It will be evident by inspection of FIG. 2 that the final hologram is in the nature of an optical grating with a number of very fine lines. More specifically, there are actually two sets of fine lines, one from each hologram.

What has been described so far relates generally to the process of the previously referred to copending application. In accordance with the present invention it is feasible to view the object in a high diffraction order, such as the hundredth order. In addition, it is possible to increase the light intensity many fold. To this end, the final hologram is made, not by printing the first and second holograms once each, but by printing them many times. Thus, the first recording material representing the first hologram with light and dark areas is exposed and printed on the recording material of the final hologram, say $n$ times where $n$, for example, may be 10. After each exposure the first recording material is displaced with respect to the final recording material by a fraction $1/n$, where $n$ is the number of exposures made. Thus, if there are 10 exposures, the two recording materials are displaced by one-tenth of the distance between two adjacent fringes.

Accordingly, there will be 10 narrow fringe lines on the final hologram where there was one in the original hologram.

The same procedure is then repeated again with the second recording material corresponding to the second hologram. Again, after each exposure, the second recording material is displaced with respect to the final recording material by $1/n$, where $n$ should be the same number of exposures as that of the first recording material. Accordingly, there are now two sets of optical gratings with $n$ times the number of lines previously present. With such a grating it is now possible to detect light at the angle corresponding to the hundredth order of the original grating. The resulting print or final hologram will diffract $n^2$ times as much light at the angle corresponding to the $n$th order of the original. This is assuming that the line width is so narrow that overlap of lines does not occur in the final recording material or contact print which has been exposed $n$ times. Preferably the final hologram is made by contact printing.

Accordingly apparatus is now needed for viewing a very high order of these interference or diffraction lines. This may be done with the apparatus of FIG. 3, which may again consist of a laser 10 having a diverging lens 11, followed by a collimating lens 14. Accordingly a collimated laser beam 17 may illuminate a previously recorded hologram 50. The hologram 50 may conveniently be arranged in a plate 51 to block off additional laser light because the hologram 50 will essentially cover only one-half of the width of the beam.

The light emerging from the hologram 50 may now be focused by focusing lens 52 on an aperture plate 53 having a suitable opening 54. The opening 54 is of such size as to pass a desired diffraction order therethrough. Thus, there may be many orders, the aperture 54 being so positioned as to pass the desired, such as the one-hundredth order therethrough. This, of course, will multiply the phase sensitivity by the factor 100. As mentioned before, the final hologram or contact print will diffract $n^2$ times as much light as one of the original holograms would. Accordingly, the light intensity is very much improved.

An apparatus for displacing one recording material with respect to another by very small amounts corresponding to a fraction of the distance between adjacent fringes has been show in FIG. 4. It will be understood however, that this apparatus has been shown by way of example only and that other conventional devices may be used for obtaining a very small controlled movement on the order of a fraction of fringe spacing.

The apparatus of FIG. 4 includes a baseplate 60 which is fixed with respect to a moveable frame 61. This makes it possible to move a recording material such as a photographic plate 62 attached to the moveable frame 61, with respect to another photographic plate 63 affixed to the baseplate 60. The respective movements between the two glass plates 62, 63 may be made very small, that is, controlled to a small fraction of a fringe spacing.

This is accomplished by a relatively simple mechanism which as shown, includes a drivescrew 64. The screw 64 extends through an elongated wooden nut 65, which is fixed to the stationary baseplate 60 by a pair of screws 66. The wooden nut 65 compensates for variations in the thread of screw 64. The rounded end portion 67 of the drivescrew 64 bears against a relatively long lever arm 68, having a fixed pivot point 70 which may consist of a knife edge. Thus the pivot point 70 may also be attached to or fixed to the fixed baseplate 60. A spring 71 is mounted between a support plate 62 fixed to the baseplate 60 and the lever 68 so as to urge the lever 68 against the drivescrew 64.

Preferably the drivescrew 64 has a very fine thread so that each revolution of the screw will advance the lever arm 68 by a very small amount.

The moveable frame 61 is now moved in accordance with a portion of the movement of the lever arm 68 by a follower pin 73. The follower pin 73 is moved in accordance with the ratio between the distances from pivot point 70 to drivescrew 68, compared to the distance between pivot point 70 and follower pin 73. Thus, the actual movement of the drivescrew 64 may be divided by a small fraction.

The moveable frame 61 is attached to baseplate 60 by a pair of leaf springs 74. Accordingly, the moveable frame 61 is caused to move substantially in parallel to the movement of the drivescrew 64 as shown by the double-headed arrow 75. It should be noted that the moveable frame 61 is spaced above the baseplate 60 by a distance sufficient to clear the lower photographic plate 63.

The lower plate 63 is fixed to the baseplate 61 by a plurality of setscrews 77 extending through the baseplate 60. The upper photographic plate 62 bears against the sidewalls 78 and 80 of the moveable frame 61. It is urged against the two walls 78, 80 by a lever 81, rotatably secured by a screw 82 to the moveable frame 61 and urged against the glass plate 62 by a spring 83, fixed between the lever 81 and the frame 61.

Attached to the fixed baseplate 60 there may be an index plate 84 bearing index marks 85. Also the drivescrew 64 may be provided with a circular plate 86 secured to its head. The plate 86 may be provided with suitable indicia, such as angles to indicate the angle of rotation of the drivescrew 64 while the index marked 85 show the number of rotations.

The operation of the apparatus of FIG. 4 will now be evident. Suitable rotation of the drivescrew 64, the angle of which may be determined from the plate 86 and the index marks 85 will rotate the lever arm 68, say in a counterclockwise direction. This movement will now be transmitted by the follower pin 73 to the moveable frame 61, causing the frame to move in a direction toward the lever arm 68. This, in turn, will move the moveable photographic plate 62 with respect to the fixed plate 63 by an amount which may be either calculated or measured. Accordingly, after each movement of the plate 62 of the plate 63 may be exposed again until the desired number of exposures is made.

The holographic interferogram of the invention may be used with advantage for measuring low density aerodynamic flow. Some applications, for example, are the determination of aerodynamic flow about an airplane model at low pressure corresponding to the upper atmosphere. The technique is particularly useful for holography of objects in transmission.

As indicated before, the angle between the reference beam and the scene beam at the recording material should preferably be small. This will cause the creation of interference fringes which are rather coarse. As a result, the fringe lines are a small fraction of the distance between adjacent fringes, than if the angle were larger. An additional result is that due to the coarseness of the interference fringes it is not necessary to utilize a recording material with the highest possible resolution, so that the film sensitivity is increased.

There has thus been disclosed a method of producing a holographic interferogram and an apparatus for viewing such an interferogram. The process of the invention permits to observe the light diffracted into a high order with a resulting increase in phase sensitivity. In addition, the object observed in light diffracted into a high order permits to increase the phase sensitivity by an appreciable amount, depending on the number of exposures made of the printed hologram. This technique is particularly useful for measurement of aerodynamic flow at low pressures. The technique permits to obtain the same advantages with holography which can conventionally be obtained by interferometric techniques.

What we claim is:

1. A process for producing a holographic interferogram having increased phase sensitivity and increased light intensity in higher diffracted orders comprising the steps of:
   a. generating a reference beam and a scene beam from the same substantially monochromatic light source;
   b. causing the scene beam and the reference beam to impinge on a first photosensitive recording material to create a first hologram and exposing the first recording material heavily, whereby fringe lines corresponding substantially to the absence of light are created on the first recording material, the fringe lines being narrow compared to the fringe spacing;
   c. interposing an object to be recorded into the scene beam and recording on a second photosensitive recording material a second hologram and heavily exposing the second hologram;
   d. reversing light and dark areas on the first and second recording material;
   e. preparing a replica of the reversed first recording material on a third photosensitive recording material by successively exposing the reversed first recording material and displacing the reversed first recording material after each exposure by a fraction of $1/n$ of a fringe spacing, where $n$ is the number of exposures;
   f. successively exposing the reversed second recording material on the same third recording material by displacing after each exposure the reversed second recording material by the same fraction of $1/n$ of the fringe spacing, thereby to obtain a double-exposed hologram having additional interpolated fringe lines;
   g. reconstructing the double-exposed hologram by substantially monochromatic light; and
   h. viewing the object with light diffracted into a predetermined large order, whereby both the phase sensitivity and the light intensity are increased.

2. A process as defined in claim 1 wherein the angle between the reference beam and the scene beam when impinging on the first and second recording material is no more than 10°.

3. A process as defined in claim 1 wherein the first and second recording material consists each of a high contrast photographic material.

4. A process as defined in claim 3 wherein said third recording material is a contact print from the two high-contrast photographic materials.

5. A process as defined in claim 1 wherein the scene beam and the reference beam are of substantially equal intensity at the recording material.